United States Patent [19]

Hawkins

[11] Patent Number: 5,599,364
[45] Date of Patent: Feb. 4, 1997

[54] FILTER LOCKING/SUPPORT SYSTEM FOR DUST COLLECTORS

[76] Inventor: Charles Hawkins, 3097 Ancerson Rd., Green Cove Springs, Fla. 32043

[21] Appl. No.: 338,244

[22] Filed: Nov. 14, 1994

[51] Int. Cl.$^6$ .......................... B01D 29/13; B01D 29/96
[52] U.S. Cl. .................. 55/378; 55/478; 55/481; 55/508
[58] Field of Search .................... 55/356, 478, 481, 55/508, 378

[56] References Cited

U.S. PATENT DOCUMENTS

| | | | |
|---|---|---|---|
| 3,131,044 | 4/1964 | Springer | 55/378 |
| 4,198,221 | 4/1980 | Catlin et al. | 55/481 |
| 4,218,227 | 8/1980 | Frey | 55/302 |
| 4,264,345 | 4/1981 | Miller | 55/481 |
| 4,322,231 | 3/1982 | Hilzendeger et al. | 55/357 |
| 4,323,376 | 4/1982 | Rosenquest | 55/304 |
| 4,504,293 | 3/1985 | Gillingham et al. | 55/478 |
| 4,632,681 | 12/1986 | Brunner | 55/508 |
| 5,123,944 | 6/1992 | Cooper | 55/378 |

Primary Examiner—Robert Warden
Assistant Examiner—Theresa T. Snider
Attorney, Agent, or Firm—Steven R. Scott

[57] ABSTRACT

A filter locking/support system for releasably urging and maintaining a plurality of separate depending filter elements in a dust collector into and in sealing engagement with the partition between the "dirty" and "clean" sections of said dust collector, said system being preferably made up of: a plurality of parallel pairs of elongated linear filter trays adapted to support cylindrical filters by the mounting plate thereof; which trays are slidably mounted upon a plurality of sloping brackets (or ramps) attached below the partition between the "clean" and "dirty" section of the dust collector such that movement of said trays in a first direction slides said trays up said ramps so as to bring the filter mounting plates resting thereon into sealing engagement with the partition and movement in the opposite direction slides said trays down said ramps so that the filters depending therefrom are no longer in sealing engagement with said partition; an automatic biasing means being provided to urge said trays in the first direction; and an operator engageable release being provided to counteract/disengage automatic biasing when desired.

17 Claims, 4 Drawing Sheets

FILTER LOCKING/SUPPORT SYSTEM FOR DUST COLLECTORS

BACKGROUND

1. Field of the Invention

The instant invention relates generally to the field of dust collectors of the back pulsed self-cleaning type. More specifically, it describes a mechanism/system, preferably biased, for releasably locking and supporting the filters utilized in such dust collectors in their operative position.

2. Prior Art in the Field

Most back pulsed dust collectors in current usage are similar in general operation to, and a good example of same may be found in, the system disclosed in U.S. Pat. No. 4,218,227. These systems are, in turn, quite similar in operation to the bag house filter assemblies that were known and used many years before the development of the more efficient and portable dust collectors in current usage.

Dust collectors of the back pulsed self-cleaning variety are generally comprised of a large housing which is partitioned into two sections: a "dirty" section and a "clean" section. Typically, the "clean" section is located above the "dirty" section in the housing. Dust laden air to be filtered enters the lower ("dirty") section and, under pressure, is forced through a series of dust filters mounted on or in the partition (which serve to remove substantially all of the dust from the air) into the upper ("clean") section. From this point the dust free air exits the housing and can be exhausted or used for a variety of purposes.

The filter elements that are almost universally utilized for the purpose of filtering dust from the air passing through such devices are of the cylindrical pleated paper variety having a mounting plate at their open end. Generally, such filters are removably mounted in one or more rows within the lower section of the dust collector housing. The open upper end of the filter elements must be tightly butted against the partition between the two sections when mounted so that the gasket provided on the mounting plate forms an air tight seal therewith. Circular apertures are provided in the partition in axial alignment with the open end of the secured filter elements such that the interior of the filter elements is in communication with the upper "clean" air section of the housing. Air passes through the filter (leaving entrained dust on the exterior thereof) and enters the interior of the cylindrical filter element. From there it is forced by the pressure differential between the upper section and the lower section into the upper section where, as previously noted, it exits the housing.

As dust continues to accumulate on the exterior of the filter elements, it is necessary to periodically clean the elements by back pulsing a jet of air downwardly through the interior of the filter element. This creates a temporary increase in air pressure within the filter in excess of the pressure outside of same, forcing dust particles away from its surface. Once released from the surface of the filter, such particles will (in general) fall to the bottom of the lower section where an auger or some other means can be utilized to remove them from the housing. Back pulsing can extend the useful life of the filter elements and help to prevent them from becoming overly laden with dust. However, at some point it is necessary to remove such filter elements for replacement. Without some means of easily and efficiently removing such elements, this can be a time consuming and dirty task for the operator. Further, since the dust accumulated on such filters may have toxic or other harmful properties, these drawbacks of removal are more than a mere inconvenience. A quick, clean and efficient means for mounting and removing dust filters is, therefore, a necessity for safe and efficient operation.

Numerous attempts to develop systems for efficiently mounting dust filters so as to be quickly and easily removable have been made in the past. These attempts have met with only limited success. Examples of such prior art devices/systems may be found in the following patents:

(1) U.S. Pat. No. 3,131,044 issued to W. E. Springer in 1964 for a Filter Bag and Suspension For Dust Collecting Apparatus.

(2) U.S. Pat. No. 3,668,843 issued to Westlin et al. in 1972 for a Filter Support Construction.

(3) U.S. Pat. No. 4,322,231 issued to Hilzendeger et al. in 1982 for a Filter Element Locking Mechanism.

(4) U.S. Pat. No. 4,323,376 issued to Rosenquist in 1982 for a Dust Collector With Quick Release Filter Support System for Use in Dust Collectors.

(5) U.S. Pat. No. 5,123,944 issued to Cooper in 1992 for Removable Filter Units.

However, none of said attempts in any way foreshadow, anticipate or render obvious the novel and creative advances and teachings of this invention.

SUMMARY AND OBJECTS OF INVENTION

The present invention may be characterized as a system, preferably biased, for locking/supporting a plurality of filters in a dust collector such that said filters are, when the system is engaged, firmly locked/supported in engagement with the partition between the "clean" and "dirty" section of said dust collector so as to create a seal therebetween. It is preferably comprised of: (a) a parallel pair (or a plurality of parallel pairs) of elongated linear filter trays adapted to support cylindrical filters by supporting the mounting plate thereof; which trays are slidably mounted upon a (b) plurality of sloping support brackets (or ramps) attached below the partition between the "clean" and "dirty" section of the dust collector such that (i) movement of said trays in a first direction parallel to the length of said trays will result in the sliding of said trays up said brackets into a position snugly adjacent to said partition (thereby sealing the filters supported thereon snugly against same) and (ii) movement of said trays in a second direction opposite said first direction will result in the sliding of said trays down said brackets into a position more distant from said partition (releasing filters supported thereon from engagement so that they can be removed from the dust collector); (c) disengageable biasing means which acts to automatically urge said trays in said first direction; and (d) means for disengaging said biasing means.

Upon review of the filter locking/support system for dust collectors taught herein, it will be found that it accomplishes numerous goals and objects not satisfied by previous devices. First, it provides an improved locking/support mechanism for use in dust collectors that is capable of releasably supporting a plurality of filter elements in tightly sealed engagement with the partition between the "clean" and "dirty" sections of said dust collector. Second, it is extremely simple and efficient to operate, greatly facilitating the operations of mounting and removing filter elements from such dust collectors. Third, it may be simply and efficiently constructed utilizing materials and techniques generally utilized in the construction of heavy mechanical/pneumatic devices such as dust collectors. Fourth, it is economical in both operation and construction. These and other objects and advantages will become even more apparent upon review of the accompanying detailed description, drawings and claims.

DETAILED DESCRIPTION OF THE PREFERRED EMBODIMENT

Figure 1:
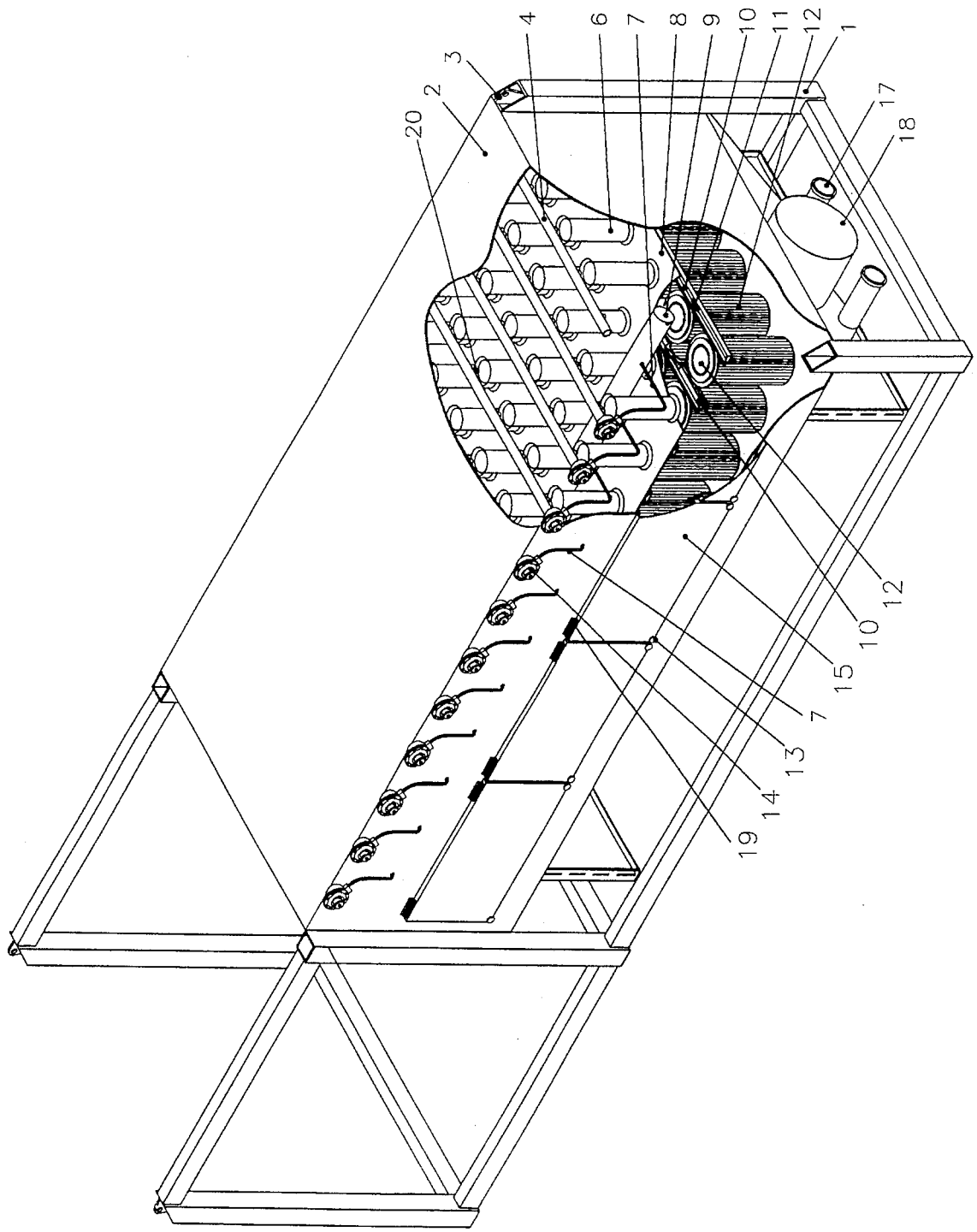
FIG. 1 provides a perspective view of the housing of a dust collector with associated elements wherein portions of the walls of said housing and other interior elements have been removed so as to allow better inspection of certain interior elements, including portions of the filter locking/support system taught by this invention.
Figure 2:
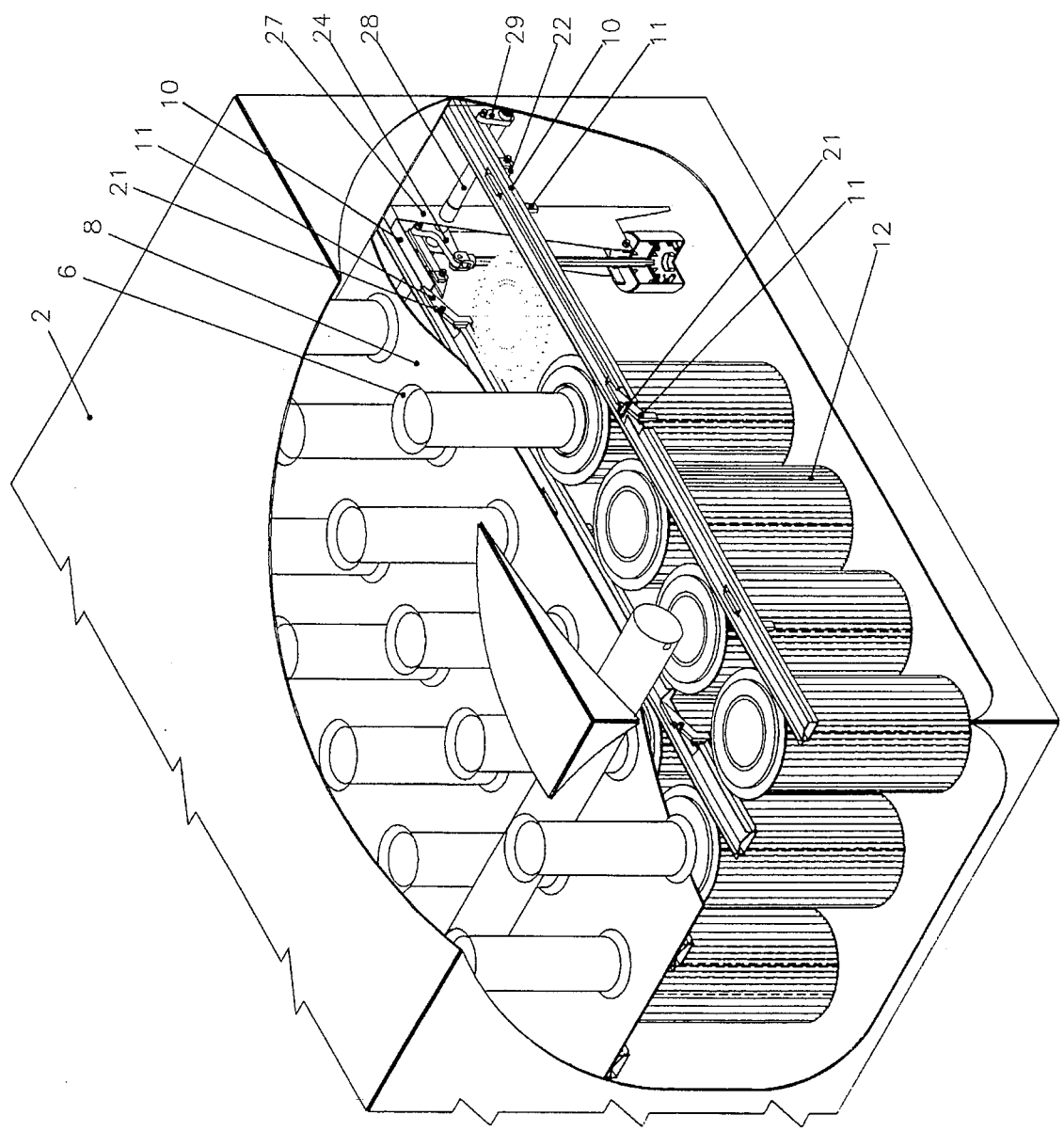
FIG. 2 provides a perspective view of a portion of the housing of a dust collector wherein a portion of its walls and other elements have been removed so as to allow inspection of certain interior elements, including portions of the filter locking/support system taught by this invention. Portions of the cylinder and shaft of the biasing means utilized in the preferred embodiments of this invention have also been removed to allow closer inspection of its interior.

The general structure and function of a typical dust collector of the type in which the instant invention could advantageously be employed may best be appreciated by reference to FIGS. 1 and 2. As will be noted, the dust collector shown is characterized by an enlarged box-like housing 2 mounted (in the large, heavy-duty example illustrated) on corner posts 1 provided with lifting eyes 3 whereby the large dust collector illustrated may be lifted and moved for transport and usage. (Not all of said corner posts 1 and lifting eyes 3 have been denominated in order to avoid overcrowding in the drawing figures). Doors 15 mounted on hinges 19 with latching means 13 are typically provided in order to provide access to the "dirty" section of the housing 2 below the partition 8 and facilitate the removal/installation of filters 12. (Not all of the filters 12, doors 15, hinges 19 and latching means 13 have been denominated in order to avoid overcrowding in the drawing figures).

Dust laden air enters the "dirty" section below partition 8 via inlet 18. After entering this section it, following the natural movement of air from high pressure to low pressure regions, passes through the air filters 12 and venturis 6 (not all of which have been denominated to avoid overcrowding of the drawing figure) into the "clean" section above the partition plate 8, where it can be removed and exhausted or utilized for other purposes. As previously discussed, periodic back pulses of high pressure air are provided through venturis 6 so as to disengage dust particles lodged in or accumulated on the outer surface of filters 12. These dust particles can then be removed via an auger (not shown) exhausting same via auger discharge pipes 17 (only one of which is denominated) or some other means.

The back pulsing mechanism utilized is characterized by a high pressure air manifold 9 which is connected via air hoses 7 to "pop-it" valves 14 which periodically release high pressure bursts of air into purge pipes 4. (Not all of said air hoses 7, "pop-it" valves 14, and purge pipes 4, are denominated to avoid overcrowding in the drawing figure). The purge pipes 4, in turn, run above a line of filters 12 and discharge said high pressure bursts (or "back pulses") via orifices 20 which direct same into the venturis 6 suspended above the openings of said filters 12.

As will be appreciated upon review of the foregoing description of the general mechanisms and operation of a typical dust collector, means must be provided to maintain the mounting plate from which the pleated paper portions of filters 12 are suspended tightly engaged against partition 8. This is necessary to insure that the gaskets provided on said mounting plates are tightly pressed against partition 8 so as to effect an air seal. Without such air seals, the dust collector will fail in its function as dust laden air will be able to avoid passing through the obstacles posed by filters 12 in transit to the "clean" section above partition 8, with a consequent contamination of said "clean" section and the exhaust therefrom.

Figure 3:
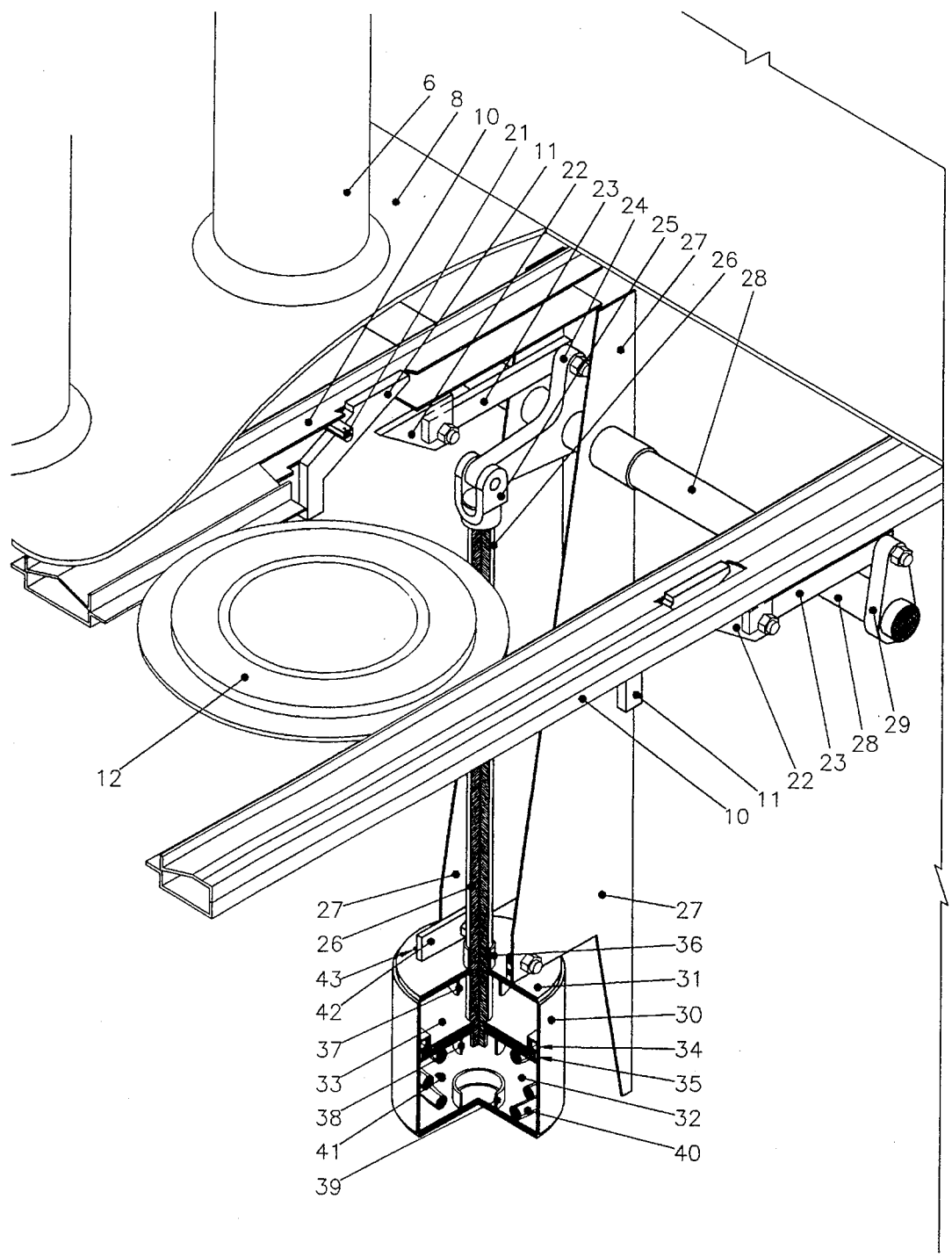
FIG. 3 provides a perspective view of the filter locking/support mechanism taught by this invention (with portions of the cylinder and shaft of the biasing means thereof cut away to allow inspection of the interior thereof) in association with certain other elements of the dust collector.
Figure 4:
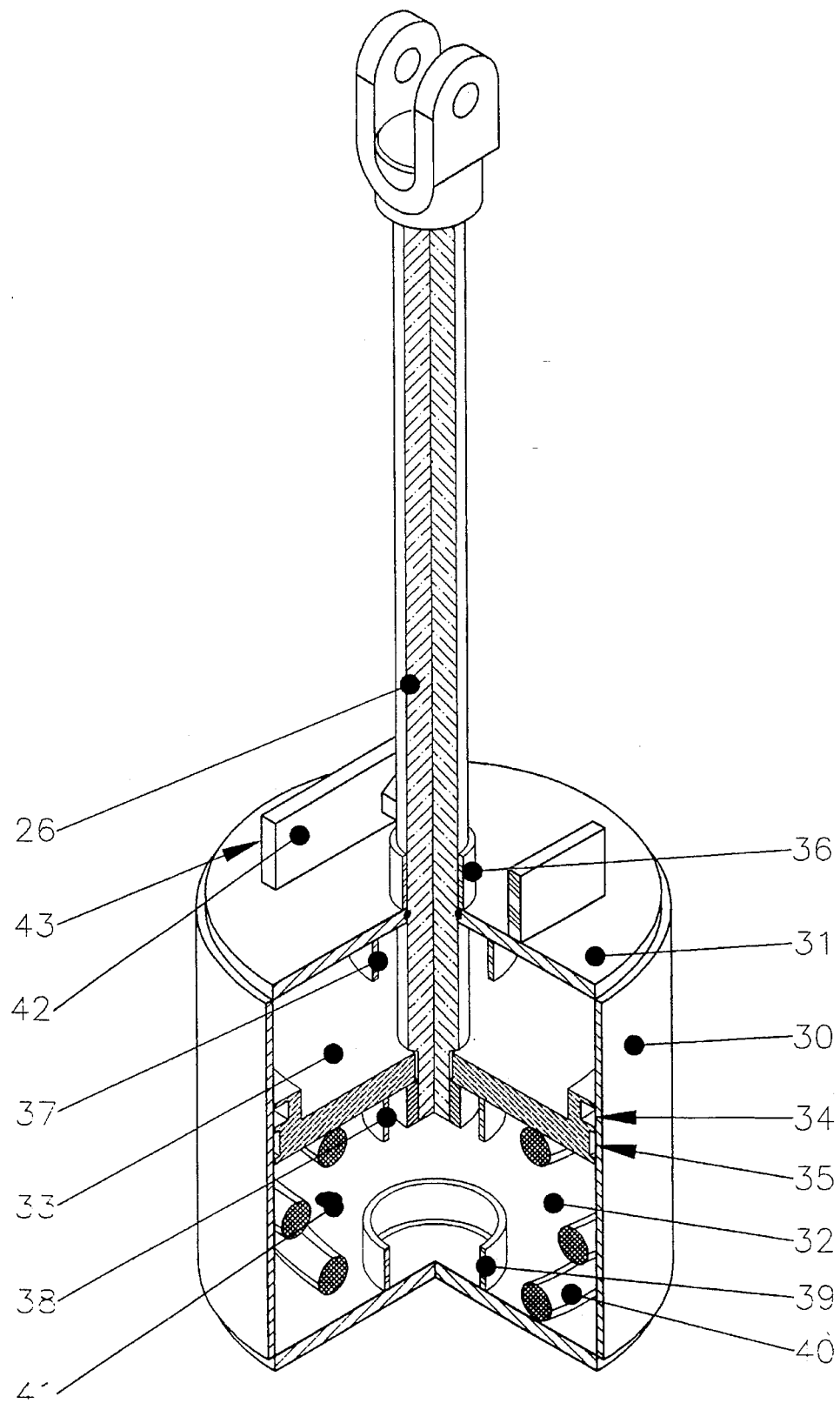
FIG. 4 provides a perspective view of the cylinder and shaft of the filter locking/support mechanism taught by this invention with portions thereof cut away so as to allow more detailed inspection of the interior thereof.

The means provided, in accordance with the teachings of this invention, for maintaining the mounting plates of the filters 12 tightly engaged against partition 8 in such a manner that they can be quickly and easily released from said engagement for replacement, can best be understood by reference to FIGS. 3 and 4. For ease of understanding, this means can be divided into three component parts, the function and design of which are described in more detail below and illustrated in said drawing figures.

1. Filter Tray Assemblies

The first component of the aforesaid means is comprised of a series of elongated linear filter support trays 10 mounted in parallel in the "dirty" section below partition 8 such that an end of each such tray 10 is adjacent to, and accessible via, the doors 15 in the housing 2 of the dust collector. As will be obvious upon review of the drawing figures provided, each pair of trays 10 is capable of supporting (suspended therebetween) a line of filters 12 via the mounting plates located at the upper or open ends of said filters 12. Further, when disengaged from their usual position adjacent to the partition 8 by the means described below, said trays 10 allow the filters 12 supported thereon to be easily removed from the dust collector by sliding them toward the doors 15. Likewise, replacement filters 12 may be quickly and easily placed and slid into operating position on said trays 10.

2. Support Ramps for Filter Tray Assemblies

The aforesaid trays 10 are hung, suspended below partition 8, on a plurality of supporting ramps 11 (which are welded or otherwise connected to the partition 8). In the embodiment illustrated, the aforesaid ramps 11 slope downward in the direction of the doors 15 of the dust collector. (However, this is not critical to the function of the inventive concept and other embodiments could be constructed in which this feature was reversed). Thus, in the embodiment illustrated, movement of the trays 10 in the direction of the doors 15 will allow said trays 10 to slide down the ramps 11 (under the force of gravity or some other biasing means) so as to bring them away from the partition 8. In this position filters 12 suspended/supported by said trays 10 may be easily installed/removed. Conversely, movement of the trays 10 in the opposite direction (away from the doors 15) will cause them to slide up the ramps 11 so that they (and the mounting plates of the filters 12 they bear) are brought adjacent to partition 8. In this position filters 12 suspended/ supported by said trays 10 are brought into contact with the partition 8 so as to create an air seal therebetween. A nylon bushing 21 is provided on the trays 10 where they contact and rest on ramps 11 to avoid binding and allow them to freely slide up and down said ramps 11.

3. Disengageable Biasing Means for Filter Tray Assemblies

The connecting mechanisms by which the biasing means described below for use in the preferred embodiment acts to urge the trays 10 in a direction away from doors 15 (so as to bring any filters 12 suspended thereon into sealed engagement with partition 8) can best be understood by reference to FIG. 3. As illustrated in FIG. 3 and prior drawing figures, trays 10 have tabs 22 connected thereto whereby they are linked via tray linkages 23 to connecting cranks 29 (or a portion of main crank arm 24) which cranks 29 are, in turn, connected to a common shaft 28. (Not all of the aforesaid multiple elements are denominated separately so as to avoid overcrowding of the drawing figures). Thus, movement of cylinder shaft 26 upward will, due to its connection via clevis 25 to main crank arm 24 and the interconnected nature of the above-described elements, urge trays 10 away from doors 15 and up ramps 11 into a position adjacent partition 8. Likewise, movement of cylinder shaft 26 downward will, via said same means, urge trays 10 toward doors 15 and down ramps 11 away from partition 8.

An overview of the disengageable biasing means utilized in this invention may best be obtained by reference to FIG. 4. As illustrated therein, such biasing means may be advantageously constructed by utilizing heavy springs 40 of the type utilized in heavy-duty trucks to provide primary biasing of trays 10 with the filters 12 they bear upward into their sealed/engaged position adjacent partition 8. A spring of the type illustrated is also advantageous as its coils taper, allowing it to collapse upon itself when compressed. This, in turn, allows for the use of a smaller cylinder 30. (However, despite the simplicity inherent in the use of the described biasing means, it will be understood by those skilled in the art that numerous other means, such as pneumatic or other fluid pressure means could be utilized for this same purpose). To disengage/counter the force of spring 40 when the operator wishes to remove/install filters 12, a pneumatic piston arrangement has been provided in the embodiment illustrated. This arrangement also has numerous advantages for this application as compressed air is readily available from and generated by the apparatus associated with dust collectors.

A more detailed understanding of the construction and function of the biasing means utilized in the instant invention can be obtained via review of FIG. 4 in conjunction with prior drawing figures. As will be noted, the top 31 of cylinder 30 is provided with mounting brackets 42 by which cylinder 30 may advantageously be held and stabilized in its position via connection of said mounting brackets 42 to braces 27. Braces 27 also serve (in the embodiment illustrated) as means for mounting shaft 28 with its associated elements. These elements, as previously described, are linked to cylinder 30 via shaft 26. Shaft 26 passes through the top 31 of cylinder 30 via brass bushing 36 to piston 33 which is, in turn, biased in an upward direction via spring 40. The piston 33 is provided with an o-ring 34 and a wear ring 35 to enhance its function, as well as a spring guide/stop 38 on its lower surface. An upper piston stop 37 is provided at the top 31 of cylinder 30, with a lower piston stop 39, at the bottom 32 of cylinder 30.

A lower cylinder orifice 41 is provided in the bottom 32 of cylinder 30 so that air can escape from the space below the piston 33 when it is forced downward by the entry of compressed air into the space above piston 33. Lower cylinder orifice 41 will likewise admit air to the space below the cylinder when the spring 40 moves the piston 33 upward. As the air contained in the "dirty" section below partition 8 would contaminate and possibly damage the system if drawn in through lower cylinder orifice 41, it is advantageous for this orifice be connected by air hose or some other means to a source of "clean" air. The manner in which this problem is solved in the preferred embodiment is discussed below.

An upper cylinder orifice 43 (which is hidden by mounting bracket 42 in the drawing figures) is provided to allow the insertion of compressed air in the space above piston 33. (The air line by which compressed air is directed into the space above piston 33 in cylinder 30 has not been shown). Thus, when the operator wishes to disengage the biasing means, switching means are utilized to direct compressed air into the space above piston 33 via upper cylinder orifice 43, forcing piston 33 downward, compressing spring 40, and causing trays 10 to lower as previously described. When it is desired to allow spring 40 to force trays 10 and other elements into their engaged positions, the same switching means can be utilized to allow compressed air in the space above the piston 33 to escape via upper cylinder orifice 43. In the preferred embodiment, the air hoses from lower orifice 41 and upper cylinder orifice 43 utilize, and are connected to, the same switching means, such that air is automatically exhausted from one while it is being inserted through the other.

The foregoing description should, however, by no means be considered to limit the scope of this invention. There are numerous means for accomplishing the goals of this invention in a manner consistent with the claims set forth below and the spirit thereof. Thus, it would be possible for this invention to be constructed so that the trays described depended from the partition in some other manner. They could, for example, be suspended (pendulum fashion) by some rigid linkage pivotally mounted to both tray and partition. This type of embodiment would also function in accordance with the teachings of this invention and would be utilizable with the other elements thereof taught herein. Further, it is not necessary that the "first direction" and the "second direction" as said terms are used herein, be parallel to the trays. By physical rearrangement of the various elements shown it would, for example, be possible to construct an embodiment in which said directions were perpendicular to said trays. Moreover, the partition need not even necessarily be horizontal for this device to function. (Although the inventor certainly believes this to be the optimal arrangement). Thus, the invention, as taught herein, should only be considered limited by the claims set forth below.

I claim:

1. A filter locking/support system including means for releasably urging and maintaining a plurality of separate depending filter elements into and in sealing engagement with a partition in a filter housing, said filter locking/support system comprising:

a plurality of parallel linear trays, each pair of said plurality of trays supporting a plurality of depending filter elements positioned therebetween;

mounting means for said plurality of parallel trays, which mounting means depend from a partition in a filter housing and serve to bring any filter elements supported by said plurality of parallel trays into sealing engagement with said partition when said trays are urged in a first direction and serve to take any filter elements supported by said plurality of trays out of sealing engagement with said partition when said trays are urged in a second direction opposite said first direction;

disengageable means connected to said plurality of parallel trays for urging said plurality trays in said first direction, which disengageable means for urging said plurality parallel trays in said first direction is comprised of: an automatic biasing means connected to said plurality of parallel trays for urging said plurality of parallel trays in said first direction; and an engageable release means connected to said plurality of parallel trays for urging said plurality of parallel trays in said second direction with force sufficient to overcome said automatic biasing means.

2. A filter locking/support system as described in claim 1, wherein said mounting means is comprised in part for urging said plurality of parallel trays in said first direction.

3. A filter locking/support system as described in claim 2, wherein said automatic biasing means is comprised in part of a spring.

4. A filter locking/support system as described in claim 3, wherein said engageable release means is comprised in part of air pressure acting via a pneumatic cylinder to generate force sufficient to overcome said automatic biasing means.

5. A filter locking/support system as described in claim 4, wherein said spring is located within said pneumatic cylinder.

6. A filter locking/support system as described in claim 2, wherein said engageable release means is comprised in part of air pressure acting via a pneumatic cylinder to generate force sufficient to overcome said automatic biasing means.

7. A filter locking/support system as described in claim 1, wherein said automatic biasing means is comprised in part of a spring.

8. A filter locking/support system as described in claim 7, wherein said engageable release means is comprised in part of air pressure acting via a pneumatic cylinder to generate force sufficient to overcome said automatic biasing means.

9. A filter locking/support system as described in claim 8, wherein said spring is located within said pneumatic cylinder.

10. A filter locking/support system as described in claim 1, wherein said engageable release means is comprised in part of air pressure acting via a pneumatic cylinder to generate force sufficient to overcome said automatic biasing means.

11. A filter locking/support system including means for releasably urging and maintaining a plurality of separate depending filter elements into and in sealing engagement with a partition in a filter housing, said filter locking/support system comprising:

a plurality of parallel linear trays, each pair of said plurality of trays supporting a plurality of depending filter elements positioned therebetween;

mounting means for said plurality of parallel trays, which mounting means depend from a partition in a filter housing and serve to bring any filter elements supported by said plurality of trays into sealing engagement with said partition when said trays are urged in a first direction and serve to take any filter elements supported by said plurality of trays out of sealing engagement with said partition when said trays are urged in a second direction opposite said first direction, said mounting means is comprised in part of a ramp which slopes away from said partition in said first direction; and disengageable means connected to said plurality of parallel trays for urging said plurality of parallel trays in said first direction.

12. A filter locking/support system as described in claim 11, wherein said disengagement means is comprised in part of a spring for urging said trays in said first direction.

13. A filter locking/support system as described in claim 12, wherein said disengageable means is comprised in part of air pressure acting via pneumatic cylinder.

14. A filter locking/support system as described in claim 11, wherein said disengageable means is comprised in part of a spring for urging said trays in said first direction.

15. A filter locking/support system as described in claim 14, wherein said disengageable means is comprised in part of air pressure acting via a pneumatic cylinder.

16. A filter locking/support system as described in claim 8, wherein said spring is located within said pneumatic cylinder.

17. A filter locking/support system described in claim 11, wherein said disengageable means is comprised in part of air pressure acting via a pneumatic cylinder.

* * * * *